Nov. 28, 1939.    C. O. COZZENS    2,181,365
OPHTHALMIC MOUNTING
Filed Feb. 24, 1937    2 Sheets-Sheet 1
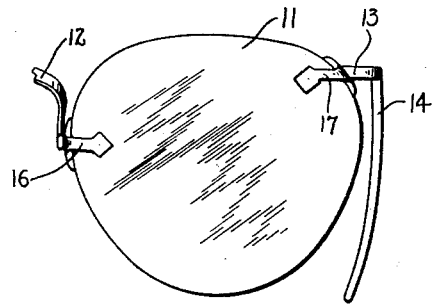
Fig. I
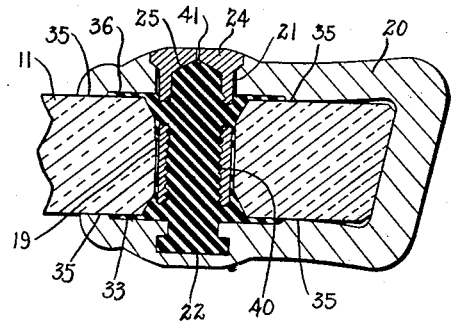
Fig. II
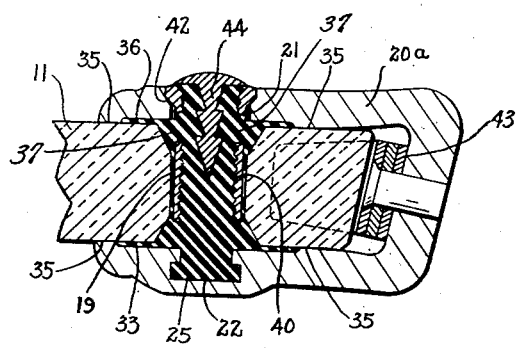
Fig. III
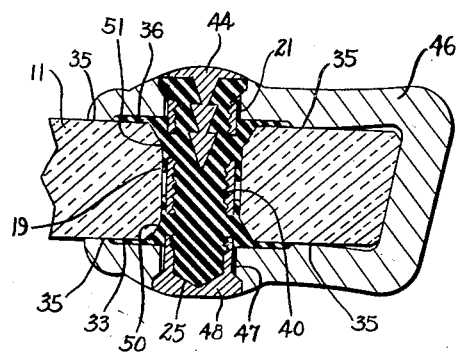
Fig. IV
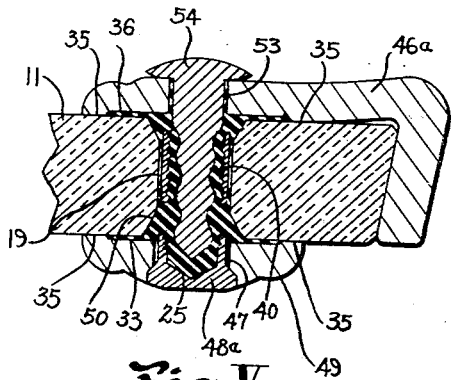
Fig. V
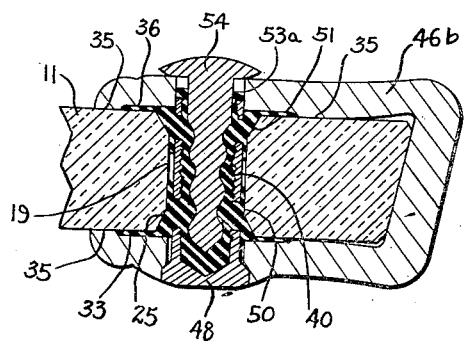
Fig. VI
INVENTOR
CHARLES O. COZZENS
BY
Harry H. Styll
ATTORNEY Nov. 28, 1939.   C. O. COZZENS   2,181,365
OPHTHALMIC MOUNTING
Filed Feb. 24, 1937   2 Sheets-Sheet 2
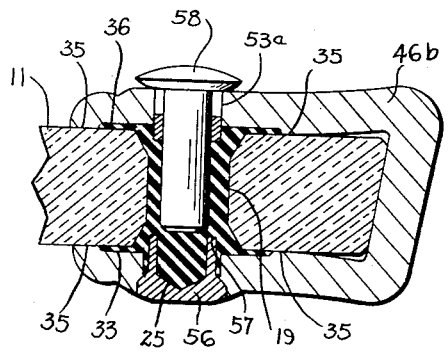
Fig. VII
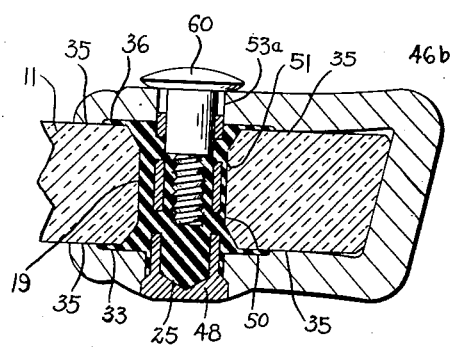
Fig. VIII
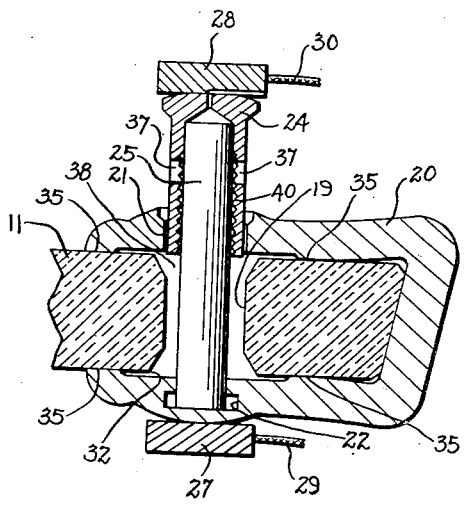
Fig. IX
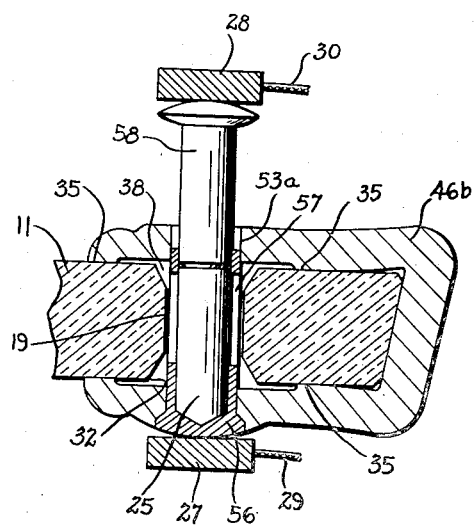
Fig. X
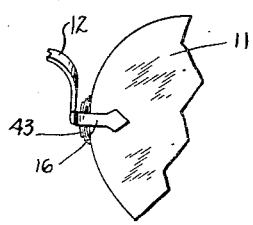
Fig. XI
INVENTOR
CHARLES O COZZENS
BY
Harry H. Styll
ATTORNEY Patented Nov. 28, 1939

2,181,365

UNITED STATES PATENT OFFICE 2,181,365

OPHTHALMIC MOUNTING

Charles O. Cozzens, Southbridge, Mass., assignor to American Optical Company, Southbridge, Mass., a voluntary association of Massachusetts Application February 24, 1937, Serial No. 127,421

7 Claims. (Cl. 88—47)

This invention relates to ophthalmic mountings, and provides improvements in the arrangement in such mountings for holding the lens. More particularly the invention relates to holding means adapted to co-operate with a perforate lens for securing the lens in position in an ophthalmic mounting.

An object of the invention is to render the lens holding device effective and of permanent security.

In the accompanying drawings which illustrate the invention,

Fig. I is a front view of one half of an ophthalmic mounting, the bridge and temple being conventionally shown;

Fig. II is a detailed sectional view through an attachment for the lens, this attachment co-operating with a perforation in the lens in accordance with my invention;

Figs. III to VIII inclusive, are similar views of other forms of my invention;

Fig. IX and X are diagrammatic views illustrating two modes of assembly of attachment with the perforate lens; and Fig. XI is a detail view in elevation of the attachment shown in Fig. III.

The wearing of rimless eyeglasses is attended by considerable likelihood of breakage at the places of connection to the bridge, to the endpiece or other part of the mounting, unless proper attachment to the lenses is made at these places. One difficulty in obtaining a proper connection arises from inaccuracies in the placement of the lens perforation. In spite of various aids to accurate placement of this perforation, it has been found in practice that in a considerable percentage of cases the perforation does not accurately register with the mounting upon assembly; and this is troublesome when an attempt is made to insert an element of the attachment through the perforation in the lens so as to secure the lens in the bight of the clip, or lens strap.

The general practice, when it is found that the perforation in the lens does not properly register, is to insert a reaming tool and enlarge the perforation either toward or away from the edge of the lens, depending upon which way the perforation is out of registry. This means that the perforation is larger than required, which is conducive of looseness in the connection either when the mounting is fitted to the patient or during the course of the usual usage to which eyeglasses are subjected.

In accordance with my invention, I insert in the perforation in the lens a sleeve which is provided with openings, and employ moldable material not only for securing the connection but also for flowing through the openings left in the sleeve so as to make fast the lens by filling in around the sleeve in direct engagement with the lens itself.

Referring to the drawings, Fig. I illustrates conventionally a so-called "rimless" opthalmic mounting. This mounting includes a lens 11 connected on the one hand to a bridge 12 and on the other hand to an endpiece 13. A temple 14, forms a continuation of the endpiece 13 and is hinged thereto, although the hinge is not apparent in Fig. I. As the lens 11 is not held within an eyewire, attachments in the form of clips or straps shown at 16 and 17 serve to connect the lens to the bridge 12 and to the endpiece 13 respectively. Substantially the same problem is involved in both the attachments 16 and 17; and accordingly the remaining discussion may be applied to either of these attachments. It will be understood, however, that if desired, the attachment 16 may assume one form of my invention while the attachment 17 assumes a different form.

In each form of my invention which is illustrated, the lens 11 is shown provided with a perforation 19 which is preferably countersunk at each face of the lens to reduce the likelihood of breakage. The form of strap 20 shown in Figs. II, III and IX includes a countersunk opening 21 in one arm and a pocket 22 in the other arm of the strap. The latter arm therefore appears to be imperforate when the strap is secured to the lens. The pocket 22 may be formed in any suitable manner, as for instance the manner disclosed in the patent to Bouchard, No. 1,878,371 dated September 20, 1932.

After the perforation 19 has been formed in the lens, as by drilling, the edge of the lens is inserted in the bight of the strap 20 so that the perforation 19 registers with the opening at 21 and pocket 22. A sleeve 24 is assembled together with a plug of moldable material 25 in the perforation 19, ready for the heating of the moldable material. The material 25 may be an organic plastic but I prefer that it be a solder of suitable composition. For instance, I may employ a solder containing lead and tin in the proportions by weight six of lead to four of tin. In general it is advantageous to use a lower melting point solder than this, and such a low melting point solder is produced by mixing equal parts by weight of tin, lead, and bismuth, or one part tin, one part bismuth and two parts lead.

I may vary the above described procedure by preparing the sleeve 24 with a charge of solder before insertion in the ophthalmic mounting. For instance, the proper amount of solder is molded therein at a softening temperature so as to settle into and take the shape of the interior of the sleeve 24. Again, a plug of the material is mechanically worked to the proper shape and cross-section for substantially fitting the interior of the sleeve 24 and is inserted in the latter. A plunger pushed in through the end of the sleeve 24 then thickens the plug 25 sufficiently so that it lodges in the sleeve.

The step of softening the moldable material 25 so as to complete the connection is diagrammatically illustrated in Fig. IX. In this figure the first of the two alternative procedures is shown, namely the one in which a separate plug of solder is assembled with the sleeve 24 and placed within the perforation 19 in the lens and the opening 21 in the strap. Electrodes 27 and 28 are brought into contact with the portion of the strap adjacent the pocket 22 and with the head of the sleeve 24 respectively. When an electric current is completed through the wire 29, the electrode 27, the attachment for the lens, the electrode 28 and the wire 30, sufficient heat is generated to soften the material 25.

It assists in a smoother carrying-out of the process if the temperature rises more rapidly at the end of the plug of material 25 contained within the pocket 22. To accomplish this the electrode 27 is of metal of greater electric resistance than the metal of the electrode 28. For instance, the latter may be of copper and the former of a nickel alloy, sold as "inconel". The heat generated in the electrode 27 is transmitted through the strap to the adjacent end of the material 25. This material itself carries current, and there is a rise in temperature in the plug 25 which results in softening the entire plug 25. Due to the transmission of heat generated in the electrode 27 itself through the strap to the adjacent end of the plug 25, this end is the first to soften so that the pocket 22 is the first to fill.

Another alternative procedure for heating the material 25 so as to flow it into place in and about the connection is to position the parts to be assembled in apparatus of the description given in Patent No. 1,978,890 to S. E. Bouchard dated Oct. 30, 1934, and to heat and push down the inserted sleeve and plug in the manner related in that patent.

As the rest of the plug 25 softens, the sleeve 24 settles down into the perforation 19. The moldable material 25 flows out into any gap between the lens 11 and the lower arm of the strap 20 such as the gap shown at 32 in Fig. IX. I find it advantageous to provide such a cushion between the rim of the perforation 19 and the arm of the strap as is provided by the fin of solder 33 which flows into the gap 32. Such a gap 32 is afforded by so forming the inner faces of the strap as to stand up slightly in relief at a slight distance away from the pocket 22 and from the opening 21. In other words, the strap is so shaped on the inner faces as to have an annular zone of the contact 35 with the lens, spaced from the perforation 19. This permits a limited flow of solder to form the fins 33 and 36 as shown in Fig. II.

The downward settling of the sleeve 24 has somewhat the effect of a plunger: this interferes with the flow of solder to form the fins 36. In order to facilitate the flow of solder out around the sleeve adjacent the opening 21, I provide the sleeve with openings 37 which permit the solder to flow outwardly from the interior of the sleeve into the gap illustrated at 38 in Fig. IX. As a result of pushing the material 25 through the openings 37, the solder is caused to mold itself in direct engagement with the lens 11. Fig. II is typical of the molding of the material 25 into the pocket 22 and into the gaps 32 and 38.

In this embodiment of my invention I prefer that no flux be employed. The material 25 is merely molded to the shape of the various recesses above referred to. To make up for the lack of adhesion to the sleeve 24, I provide the latter on its interior with unevennesses 40 which bring about an anchoring of the moldable material 25 within the sleeve 24.

In the procedure which has been specifically described in connection with Fig. IX a plug of moldable material 25 is employed. In order to vent any gas such as air which may be trapped in the upper part of the sleeve 24, I provide a vent hole 41 through the head of the sleeve. When the other alternative procedure is followed and the material 25 is molded into the sleeve as a preliminary step, the vent 41 is not required and may be omitted unless it is desired to use a somewhat smaller quantity of solder and to permit the portion of the solder which was originally within the head of the sleeve to flow downwardly and outwardly through the openings 37.

It is not necessary that the sleeve be closed across at its head end. Instead I may construct the sleeve in the manner indicated in Fig. III. Here a sleeve 42 is carried by the strap 20a by being mounted in the contersunk opening 21 therein. The outer end of the sleeve 42 is outwardly flared to seat against the countersunk portion of the opening 21. The sleeve extends from the strap 20a into the perforation 19 in the lens; and is provided with openings 37 as in the embodiment of my invention illustrated in Fig. II, so that material 25 may flow into the gap shown empty at 38 in Figs. IX and X. By restricting the length of the sleeve 42 the moldable material 25 is caused to flow outwardly into the gap shown at 32 in Figs. IX and X. Thus in the embodiment shown in Fig. III fins 33 and 36 are formed as in the first embodiment, the extent of these fins being limited by the annular contact 35 as in the first embodiment.

In this embodiment a further precaution against breakage is taken by introducing flexibility into the construction. Leaf springs 43 are riveted to the shank of the strap and resiliently position the lens 11 relative to axis of the sleeve 42.

Because of the open ends of the sleeve 42, the possibilities of procedure in softening the material 25 are less restricted. As before, the material 25 may be molded or punched into the sleeve 42 as a primary step, and such solder containing sleeves can be kept in stock. If separate plugs of moldable material 25 are to be used, such a plug may be inserted in the sleeve 42 either before or after the sleeve is put in place in the perforation 19 and opening 21. These possibilities do not introduce any new problem in the softening of the material 25, so that what has already been disclosed in connection with Figs. II and IX is sufficient instruction for assembling parts of the attachment shown in Fig. III.

The use of a pin 44 for closing the open end of the sleeve 42 does afford a chance for further variation in the procedure. If the sleeves as carried in stock contain the material 25, already settled into place, the pin 44 may be already embedded in the material 25; so that the unit composed of a sleeve 42, material 25 molded therein and a pin 44 embedded in this material is ready to be put in place in the perforation 19 and locked to the lens by the softening and flow of the material 25 as above described. On the other hand, the pin 44 may be inserted as a final step. In such case the pin 44 is supplied as a separate part and is pushed into the perforation shown in Fig. III while the material 25 is still soft. The pin 44 acts as a plunger pushing the material 25 into the various recesses.

A further embodiment of my invention is disclosed in Fig. IV in which the strap 46 is provided with aligned countersunk openings 47 and 21. A sleeve 48 is inserted through the opening 47 into the perforation 19 in the lens, the head of the sleeve resting against the countersunk portion of the opening 47. In this case the pin 44 is pushed into the material 25 from the other end of the perforation 19, that is through the opening 21. With this form of attachment, the solder or other material 25 may be molded in the sleeve 48 as above described, or may be supplied as a separate plug. Openings are provided in the side walls of the sleeve 48 at 50 and at 51 so as to permit flow of material 25 out into the gaps shown unfilled at 32 and 38 in Figs. IX and X, and form the fins 33 and 36.

The material 25 is anchored to the sleeve 48 by means of inequalities 40 in the side walls of the sleeve. Pushing the pin 44 down into the material 25 molds shoulders of this material in engagement with the countersunk portion of the opening 21. Since no flux is employed, any material 25 which exudes from underneath the rim of the pin 44 can be readily detached from the surface of the strap.

The embodiment of my invention shown in Fig. IV may be further modified as shown in Figs. V and VI. As shown in Fig. IV the sleeve 48 is long enough so that with the average thickness of lens the inserted end of the sleeve 48 extends into the opening 21. There is considerable variation in the thickness of ophthalmic lenses. If the lens is so thin that the sleeve 48 extends too far into the opening 21, the sleeve can be shortened by filing off the end, or in other suitable manner shortening the sleeve. If the lens is of sufficient thickness, a longer sleeve than the one shown in Fig. IV may be employed, or a sleeve of the length shown may be used since it is not essential that the end of the sleeve 48 be received within the opening 21. The embodiment shown in Fig. V calls for less consideration of the thickness of the lens since the sleeve 48a is in this case short enough so as to stop short of the strap 46a. Accordingly, opening 53 as provided in the strap 46a is of less diameter than that of the sleeve 48a. This strap has but one arm, and the sleeve 48a projects into the perforation in the lens through a washer 49 which engages the lens in an annular contact portion 35. The head of the sleeve 48a engages the countersunk portion of the opening 47 in the washer 49. It is obvious that the sleeve 48a may be made integral with the washer 49. A pin 54 is pushed into the material 25 through the opening 53, the shank of the pin being of approximately the same diameter as the opening 53.

The sleeve 48a may have the material 25 already molded therein or may be used with a separate plug of material. After the softening of the material, the pin 54 is pushed into place and acts as a plunger to force the material 25 into the various recesses. Inasmuch as the sleeve 48a stops short of the strap 46a, but one set of openings 50 is required in order that both the fin 33 and the fin 36 may be formed.

The embodiment illustrated in Fig. VI is similar in many respects to that illustrated in Fig. V. The pin 54 is substantially the same, but the opening 53a is enlarged so as to receive the end of the sleeve 48. This sleeve has both the set of openings 50 and the set of openings 51 so as to permit the material 25 to flow out into both the gap shown at 32 and the gap shown at 38 in Figs. IX and X, forming the fins 33 and 36. Some of the material 25 will be forced up around the shank of the pin; and if enough material 25 is employed, some may exude out from underneath the head of the pin 54, but if so the excess material can be readily detached from the outer surfaces of the strap 46b. The latter is substantially identical with the two-arm strap 46, except for the cylindrical opening 53a.

In the embodiments shown in Figs. III and IV the pin 44 is not primarily depended upon for holding to the lens the arm of the strap which is on that side of the lens; because the flared end of the sleeve 42 seats against the countersunk portion of the opening 21 in the embodiment of Fig. III, while shoulders of material 25 are molded against this countersunk portion of the opening 21 in the embodiment of the Fig. IV. The pin 44 nevertheless is anchored in the material 25 by projecting portions such as illustrated in these figures. In Figs. V and VI the head of the pin 54 is depended upon primarily to hold to the lens the arm of the strap 46a or 46b as the case may be. No flux being employed, the pin is provided along its length with irregularities by which the pin is anchored in the material 25, these irregularities being shown in Figs. V and VI as a series of grooves.

Because of the difficulty of removing a pin whose head is down in a countersunk opening such as 21, the periphery of the head of the pin 54 is slightly spaced from the strap as illustrated in Figs. V and VI so as to permit a tool to be inserted under the head for removing the pin after the material 25 has been re-softened. This permits the removal of one lens and the substitution of another, or the removal of one mounting from a pair of lenses and the substitution of another mounting.

In the embodiment illustrated in Fig. VII, the sleeve 56 is carried by the strap 46b in substantially the same arrangement as in the embodiment shown in Fig. VI: the sleeve, however, is provided with a set of slots 57 in its side walls instead of the sets of openings 50 and 51. It will be noted that the inserted end of the sleeve 56 is received within the opening 53a in the strap. The pin 54 is replaced by a pin 58 which serves as a plunger for forcing the material 25 out from the interior of the sleeve 56 through the slots 57. This plunger-like pin 58 fits the interior of the sleeve 56 so that the material 25 may not work its way up between the sleeve and the shank of the pin. The fins 33 and 36 are formed, however, as before. This embodiment has the advantage that it tends to avoid the discharge of material 25 from underneath the head of the pin 58 onto the exterior surfaces of the strap. With this form of my invention the pin 58 should be pre-fluxed so as to be soldered to the interior of the sleeve 56. A coating of tin on the interior of the sleeve 56 is of assistance, as is well known in the art.

Fig. VIII illustrates a modification of the form of my invention shown in Fig. VII. In this modified embodiment of Fig. VIII either a sleeve 48 having sets of openings 50 and 51 therein may be employed or a sleeve 56 having slots 57 therein may be employed. Fig. VIII shows the former. The plunger-like pin 53 has been replaced by a pin 60 which fits within the end of the sleeve 48 so as to prevent material 25 from making its way up between the pin 60 and the sleeve 48; but the lower portion of the pin 60 is provided with irregularities for anchoring the pin in the material 25. A series of grooves may be employed, such as shown on the pin 54 in Fig. V, or the pin may be threaded as shown in Fig. VIII. The provision of the openings 50 and 51 permits the material 25 to flow into the gaps shown empty at 32 and 38 in Figs. IX and X and form the fins 33 and 36. In the forms of my invention illustrated in Figs. VII and VIII, I prefer to use sleeves which have been provided with material 25 as a preliminary operation.

Fig. X illustrates the assembling of a device such as illustrated in Fig. VII, and Fig. X shows a sleeve into which material 25 has been molded before being assembled with the other parts of the device. The electrodes 27 and 28 may be used if desired, as in the procedure set forth in connection with Fig. IX. The generation of heat within the electrode 27 itself is not necessary, however, with the form of device shown in Fig. VII; and therefore electrodes may be employed which bring about uniform heating of the material 25. The softened material is caused to flow out through the slots 57 into the gaps 32 and 38 as the plunger-like pin 53 descends. As a result, the fins 33 and 36 are formed. The pin 58 substantially closes the end of the sleeve 56 so that the material 25 is trapped, and there is less chance of an overflow of such material out onto the exterior of the strap.

Figs. VII and VIII are typical of the advantageous manner in which a device in accordance with my invention cooperates with an inaccurately drilled perforation 19. Fig. VII illustrates the application of my invention to a perforation which was originally drilled too close to the edge of the lens and had to be reamed on the side of the perforation away from the edge of the lens. Fig. VIII illustrates the application of my invention to a lens which was originally drilled too far away from the edge of the lens. It is clear that these inaccuracies in drilling are taken care of by my invention, and that the lens is solidly held to the strap by the solidification of the material 25 in and about the sleeve 48.

By following the teachings of my invention successful attachment of a lens to a bridge or endpiece or both will result in an unusually large percentage of cases; and therefore lost time due to the necessity of doing the work over again is considerably reduced. Moreover, there is little likelihood that the lens will be broken in the course of the assembling operation, particularly where cushioning fins of solder such as illustrated at 33 and 36 are formed.

While I have illustrated and described certain embodiments of my invention and have explained certain methods of assembling devices embodying my invention, it will be understood that my invention is not restricted to the specific embodiments shown but may be otherwise embodied and practiced within the scope of the following claims.

I claim:

1. In an ophthalmic mounting, a perforate lens, a strap overlying the lens at at least one end of the perforation in the lens and at an adjacent portion of the edge of the lens, a sleeve extending into the perforation in the lens from one end thereof, a securing body of moldable material in and about the sleeve, and a pin extending into the sleeve from the other end of the lens perforation and embedded in said moldable material, the pin and sleeve each having a head portion and the strap being held to the lens by at least one of said head portions.

2. In an ophthalmic mounting, a perforate lens, a lens strap having members overlying the lens at the opposite ends of the perforation in the lens, a sleeve carried by one of said members extending into said perforation, a securing body of moldable material in and about the sleeve, and a pin anchoring said body of moldable material to the other of said members.

3. In an ophthalmic mounting, a perforate lens, a lens strap overlying the edge of the lens adjacent said perforation and having members overlying the faces of the lens at the ends of the perforation, a sleeve set into one of said members and extending into said perforation, and a securing body of moldable material anchored to the other of said members and keyed to said sleeve by extending within said sleeve and through openings in the wall thereof so as to provide an integral body disposed both inside and outside of said sleeve.

4. In an ophthalmic mounting, a lens having an opening therein, lens holding means having portions overlying the opposed side surfaces of the lens and said lens opening, with at least one of said portions having a part overlying the adjacent edge of the lens, a longitudinally rigid tubular member having an opening in the side wall thereof and an end portion in holding relation with one of said portions overlying the side surface of the lens, said tubular member being of substantially less diameter than the width of the opening in the lens by an amount to permit a heat softenable binding material to flow about said tubular member and a securing body of heat softenable binding material having a portion thereof lying within said tubular member with other portions thereof extending through the opening in the side wall of the tubular member and filling in the space between said tubular member and the wall of the opening in the lens and shaped substantially to the shape of said wall at least throughout a portion of the length of the tubular member thereby interlocking the tubular member with the binding material, the holding relation of said tubular member with said portion of the lens holding means overlying the side surface of the lens being independent of the binding material, and said portion overlying the opposed side surface of the lens having means rigidly connected with said binding material and cooperating with the interlocked relation of the binding material with the tubular member to secure the lens strap to the lens with the binding material rigidly retaining said strap on said lens.

5. In an ophthalmic mounting, a lens having an opening therein, lens holding means having portions overlying the opposed side surfaces of the lens with perforations substantially aligned with the lens opening, with at least one of said portions having a part overlying the adjacent edge of the lens, a tubular member extending within the perforation in one of said portions overlying the side surface of the lens and having an enlarged head engaging said portion, said tubular member being of substantially less diameter than the width of the opening in the lens by an amount to permit a heat softenable binding material to flow about said tubular member and having an opening in the side wall thereof internally of the opening in the lens, a securing body of heat softenable binding material having a portion thereof lying within said tubular member with other portions thereof extending through the opening in the side wall of the tubular member and filling in the space between said tubular member and the wall of the opening in the lens and shaped substantially to the shape of said wall, at least throughout a portion of the length of the tubular member thereby interlocking the tubular member with the binding material, the enlarged head of said tubular member in engagement with the portion of the lens holding means overlying the side surface of the lens, providing means for limiting the movement of the tubular member inwardly of the perforation in said portion, and anchor means extending within the perforation in said portion overlying the opposed side surface of the lens and extending inwardly of the binding material and cooperating with the interlocked relation of the binding material with the tubular member and with the enlarged head of the tubular member to secure the lens strap to the lens with the binding material rigidly retaining said strap on said lens.

6. An ophthalmic mounting embodying a lens having spaced connection openings therein, a bridge member for supporting said lens in spaced relation with another lens of the mounting, temple supporting means and lens holding means for connecting said bridge member and temple supporting means to said lens, lens holding means having portions overlying the opposed side surfaces of the lens and said lens opening, with at least one of said portions having a part overlying the adjacent edge of the lens, a longitudinally rigid tubular member having an opening in the side wall thereof and an end portion in holding relation with one of said portions overlying the side surface of the lens, said tubular member being of substantially less diameter than the width of the opening in the lens by an amount to permit a heat softenable binding material to flow about said tubular member and a securing body of heat softenable binding material having a portion thereof lying within said tubular member with other portions thereof extending through the opening in the side wall of the tubular member and filling in the space between said tubular member and the wall of the opening in the lens and shaped substantially to the shape of said wall, at least throughout a portion of the length of the tubular member thereby interlocking the tubular member with the binding material, the holding relation of said tubular member with said portion of the lens holding means overlying the side surface of the lens being independent of the binding material, and said portion overlying the opposed side surface of the lens having means rigidly connected with said binding material and cooperating with the interlocked relation of the binding material with the tubular member to secure the lens strap to the lens with the binding material rigidly retaining said strap on said lens.

7. An ophthalmic mounting embodying a lens having spaced connection openings therein, a bridge member for supporting said lens in spaced relation with another lens of the mounting, temple supporting means and lens holding means for connecting said bridge member and temple supporting means to said lens, said lens holding means having portions overlying the opposed side surfaces of the lens with perforations substantially aligned with the lens opening, with at least one of said portions having a part overlying the adjacent edge of the lens, a tubular member extending within the perforation in one of said portions overlying the side surface of the lens and having an enlarged head engaging said portion, said tubular member being of substantially less diameter than the width of the opening in the lens by an amount to permit a heat softenable binding material to flow about said tubular member and having an opening in the side wall thereof internally of the opening in the lens, a securing body of heat softenable binding material having a portion thereof lying within said tubular member with other portions thereof extending through the opening in the side wall of the tubular member and filling in the space between said tubular member and the wall of the opening in the lens and shaped substantially to the shape of said wall, at least throughout a portion of the length of the tubular member thereby interlocking the tubular member with the binding material, the enlarged head of said tubular member in engagement with the portion of the lens holding means overlying the side surface of the lens, providing means for limiting the movement of the tubular member inwardly of the perforation in said portion, and anchor means extending within the perforation in said portion overlying the opposed side surface of the lens and extending inwardly of the binding material and cooperating with the interlocked relation of the binding material with the tubular member and with the enlarged head of the tubular member to secure the lens strap to the lens with the binding material rigidly retaining said strap on said lens.

CHARLES O. COZZENS.